United States Patent
Shima et al.

(10) Patent No.: US 9,679,196 B2
(45) Date of Patent: Jun. 13, 2017

(54) OBJECT SENSING DEVICE

(71) Applicant: Hitachi Automotive Systems, Ltd., Hitachinaka-shi, Ibaraki (JP)

(72) Inventors: Takeshi Shima, Tokyo (JP); Haruki Matono, Tokyo (JP); Shinji Kakegawa, Tokyo (JP); Yuji Otsuka, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 14/770,604

(22) PCT Filed: Feb. 3, 2014

(86) PCT No.: PCT/JP2014/052377
§ 371 (c)(1),
(2) Date: Aug. 26, 2015

(87) PCT Pub. No.: WO2014/132747
PCT Pub. Date: Sep. 4, 2014

(65) Prior Publication Data
US 2016/0012282 A1    Jan. 14, 2016

(30) Foreign Application Priority Data
Feb. 27, 2013  (JP) ................. 2013-036564

(51) Int. Cl.
*G06K 9/00* (2006.01)
*H04N 5/235* (2006.01)
(Continued)

(52) U.S. Cl.
CPC ............ *G06K 9/00369* (2013.01); *B60R 1/00* (2013.01); *G06K 9/00684* (2013.01);
(Continued)

(58) Field of Classification Search
USPC ........ 382/100, 103–107, 154–155, 162, 173, 382/181, 189–194, 199, 209, 219, 232,
(Continued)

(56) References Cited

U.S. PATENT DOCUMENTS 7,548,634 B2 *  6/2009  Kudo .................... B60W 30/16
                                                            382/103
7,887,089 B2 *  2/2011  Breed ............... B60R 21/01536
                                                            180/272
(Continued)

FOREIGN PATENT DOCUMENTS

EP    2 346 014 A1    7/2011
EP    2 615 596 A1    7/2013
(Continued)

OTHER PUBLICATIONS

International Search Report (PCT/ISA/210) dated Mar. 18, 2014 with English-language translation (four (4) pages).
(Continued)

*Primary Examiner* — Seyed Azarian
(74) *Attorney, Agent, or Firm* — Crowell & Moring LLP

(57) ABSTRACT

In order to provide an object sensing device whereby, among limited computation resources, performance is improved in sensing an object when sense processing a plurality of objects to be sensed, an object sensing device includes image capture units which capture images external to a host vehicle, and a processing device which sense processes objects to be sensed from the images which are captured by the image capture units, said processing device further including: a scene analysis unit which analyzes a travel scene of the host vehicle; a process priority change unit which changes a sensing process priority of the object to be sensed on the basis of the travel scene which is analyzed by the scene analysis unit; and an object to be sensed sensing unit which carries out a sensing of the object to be sensed on
(Continued)

the basis of the sensing process priority which is changed by the process priority change unit.

21 Claims, 12 Drawing Sheets

(51) Int. Cl.
| | | |
|---|---|---|
| *H04N 13/02* | (2006.01) | |
| *H04N 7/18* | (2006.01) | |
| *B60R 1/00* | (2006.01) | |
| *G06T 7/593* | (2017.01) | |
| *G06F 7/00* | (2006.01) | |
| *H04N 13/00* | (2006.01) | |

(52) U.S. Cl.
CPC ..... *G06K 9/00791* (2013.01); *G06K 9/00805* (2013.01); *G06K 9/00993* (2013.01); *G06T 7/593* (2017.01); *H04N 5/2353* (2013.01); *H04N 7/188* (2013.01); *H04N 13/0239* (2013.01); *B60R 2300/30* (2013.01); *B60R 2300/60* (2013.01); *B60R 2300/804* (2013.01); *G06T 2207/10021* (2013.01); *G06T 2207/20076* (2013.01); *G06T 2207/30196* (2013.01); *G06T 2207/30252* (2013.01); *G06T 2207/30256* (2013.01); *H04N 2013/0092* (2013.01)

(58) Field of Classification Search
USPC ....... 382/243, 254, 274, 276, 285–291, 305, 382/312; 701/301, 36; 348/135; 180/272
See application file for complete search history.

(56) References Cited

U.S. PATENT DOCUMENTS

| | | | |
|---|---|---|---|
| 8,320,626 | B2 | 11/2012 | Higuchi et al. |
| 2003/0191568 | A1* | 10/2003 | Breed ................... B60W 40/06 701/36 |
| 2011/0205042 | A1 | 8/2011 | Takemura et al. |
| 2012/0035846 | A1* | 2/2012 | Sakamoto ........... B60T 8/17558 701/301 |
| 2013/0016915 | A1 | 1/2013 | Hashimoto et al. |
| 2013/0147948 | A1* | 6/2013 | Higuchi ............. H04N 13/0246 348/135 |
| 2013/0223686 | A1 | 8/2013 | Shimizu et al. |

FOREIGN PATENT DOCUMENTS

| | | |
|---|---|---|
| JP | 2001-351200 A | 12/2001 |
| JP | 2005-217883 A | 8/2005 |
| JP | 2009-187351 A | 8/2009 |
| JP | 2010-3254 A | 1/2010 |
| JP | 2010-160777 A | 7/2010 |
| JP | 2011-100257 A | 5/2011 |
| JP | 2011-192071 A | 9/2011 |
| JP | 2012-155399 A | 8/2012 |
| JP | 2013-242670 A | 12/2013 |
| WO | WO 2010/038851 A1 | 4/2010 |
| WO | WO 2012/033173 A1 | 3/2012 |

OTHER PUBLICATIONS

Translation of Japanese Office Action issued in counterpart Japanese Application No. 2015-502824 dated Jun. 7, 2016 (five (5) pages).
Extended European Search Report issued in counterpart European Application No. 14757497.4 dated Nov. 7, 2016 (ten (10) pages).

* cited by examiner

FIG. 5

| | | LOCATION ATTRIBUTES | | | | | | |
|---|---|---|---|---|---|---|---|---|
| | | URBAN AREA | RESIDENTIAL AREA | COMMERCIAL FACILITIES | SCHOOL | HIGHWAY | ELEVATED ROAD | MOUNTAINOUS AREA | ROAD WITH FEW INTERSECTIONS |
| IMAGE SCENE | GUARD RAIL/ SHRUBBERY | 10 | 10 | 30 | 50 | 5 | 5 | 10 | 10 |
| | GAP BETWEEN GUARD RAIL/ SHRUBBERY | 70 | 70 | 90 | 70 | 5 | 5 | 10 | 10 |
| | CROSSWALK | 70 | 70 | 90 | 90 | — | — | 20 | 30 |
| | SIDEWALK WITHOUT GUARD RAIL | 70 | 70 | 90 | 90 | 5 | 5 | 10 | 10 |
| | PARKED VEHICLE | 40 | 40 | 60 | 60 | 90 | 90 | 40 | 40 |
| | GAP BETWEEN PARKED VEHICLES | 60 | 60 | 90 | 90 | 90 | 90 | 40 | 40 |

FIG. 6
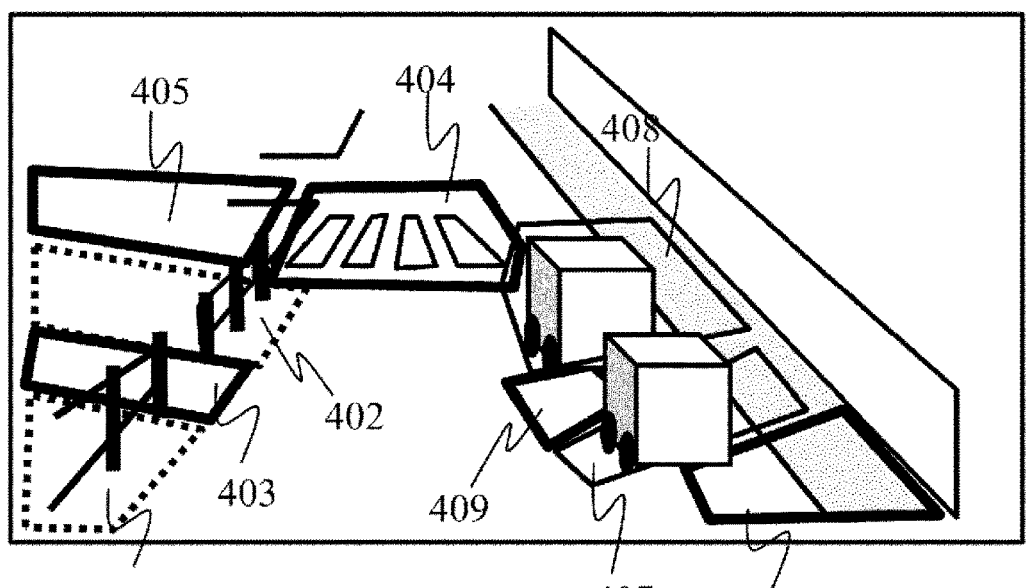
 : REGION WITH 90% PROBABILITY OF EXISTENCE OF PEDESTRIANS
 : REGION WITH 60% PROBABILITY OF EXISTENCE OF PEDESTRIANS
 : REGION WITH 30% PROBABILITY OF EXISTENCE OF PEDESTRIANS

OBJECT SENSING DEVICE

TECHNICAL FIELD

The present invention relates to an object sensing device that detects objects in a vehicle's surroundings from image information outside of the vehicle.

BACKGROUND ART

In order to realize safe travel of a vehicle, research and development is underway regarding devices that detect dangerous phenomena around a vehicle and automatically control the steering, accelerator, and brakes of the vehicle to avoid any dangerous phenomena that has been detected, and such devices have already been installed in some vehicles. Among such devices, a system that senses a pedestrian crossing in front of the vehicle with a sensor installed in the vehicle and warns the driver or automatically applies the brakes if there is a possibility of colliding with the pedestrian is effective in terms of enhancing the vehicle safety.

A camera or radar and a processing device that processes signals therefrom are used to sense a pedestrian in front of the vehicle with a sensor installed in the vehicle. In order to improve the sensing performance thereof, it is necessary to execute more detailed processes in the processing device. However, the computation resources of such a processing device are limited, and the processing device must simultaneously process other objects to be sensed in addition to the process for sensing a pedestrian. Thus, it is necessary to assign a priority to the processes and intensively execute the calculation processes. In order to achieve this, PTL 1 discloses one effective means for intensively executing processes in a scene in which there is a high possibility that a pedestrian exists, and PTL 1 further discloses an existence probability indicating the possibility that a pedestrian exists.

CITATION LIST

Patent Literature

PTL 1: JP 2010-3254 A

SUMMARY OF INVENTION

Technical Problem

PTL 1 discloses finding an existence probability that a pedestrian is likely to move after a pedestrian has been detected, but does not disclose improving the performance itself of detecting a pedestrian. Therefore, in order to improve the pedestrian sensing performance itself, the pedestrian existence probability must be calculated before sensing a pedestrian to determine whether to intensively process the pedestrian.

An object of the present invention is to provide an object sensing device that improves the sensing performance of an object when processing to sense a plurality of objects to be sensed given limited computation resources.

Solution to Problem

To achieve the above object, an object sensing device of the present invention includes: an image capture unit that captures surroundings of a host vehicle; and a processing device that executes a sensing process of an object to be sensed from an image captured by the image capture unit, wherein the processing device includes: a scene analysis unit that analyzes a travel scene of the host vehicle; a process priority change unit that changes a sensing process priority of the object to be sensed based on the travel scene analyzed by the scene analysis unit; and an object-to-be-sensed sensing unit that senses the object to be sensed based on the sensing process priority changed by the process priority change unit.

Advantageous Effects of Invention

According to the invention, an object sensing device that improves the sensing performance of an object when processing to sense a plurality of objects to be sensed given limited computation resources can be provided.

BRIEF DESCRIPTION OF DRAWINGS

FIG. 5 illustrates an example of learned data for calculating an existence probability in the present invention.

FIG. 6 schematically explains the existence probability calculation in the present invention.

DESCRIPTION OF EMBODIMENTS

Embodiments of the present invention are hereinafter described with reference to the drawings.

Embodiment 1

An embodiment of a stereo camera, which is an object sensing device, of the present invention will be explained below. Specifically, an embodiment of an object sensing device that senses a pedestrian using images of a stereo camera installed in a vehicle will be explained.

First, an overview of the object sensing device of the present invention will be explained using FIG. 1.

Figure 1:
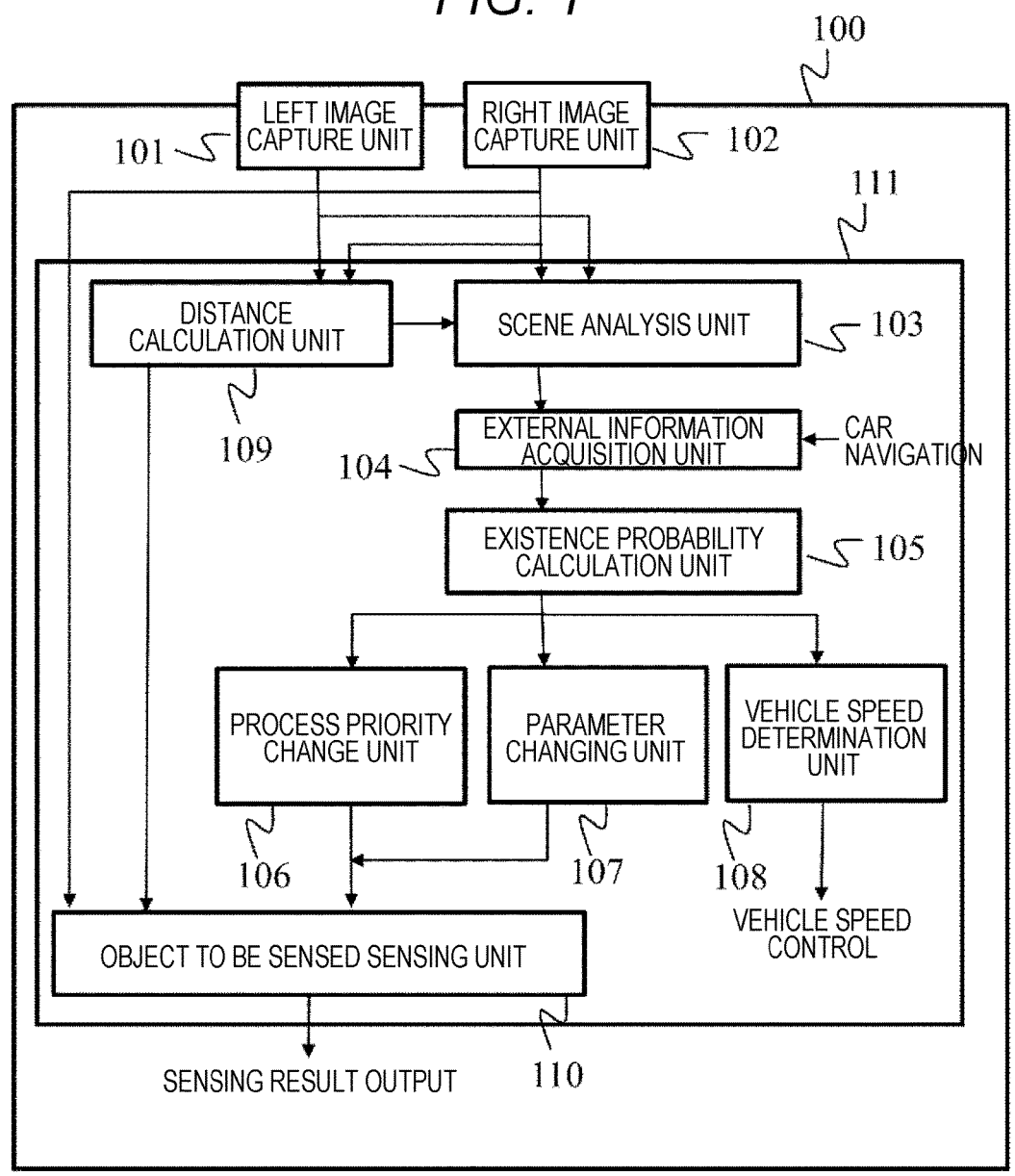
FIG. 1 illustrates an example of the constitution of an object sensing device according to the present invention.

FIG. 1 is a block diagram realizing the object sensing device of the present invention. The object sensing device includes a stereo camera 100, a left image capture unit 101 of the stereo camera, and a right image capture unit 102 of the stereo camera. The left image capture unit 101 and the right image capture unit 102 capture images of the front of the vehicle in which the stereo camera is installed. The captured images are processed in a processing device 111.

The processing device 111 will now be explained in detail below.

An image from the right image capture unit 102 is input into a scene analysis unit 103, and the scene analysis unit 103 analyzes the scene regarding what is captured in the image. The following explanation will focus on the processing of an image from the right image capture unit 102, but an image from the left image capture unit 101 may also be processed in this way.

Next, in an external information acquisition unit 104, information for calculating an existence probability of an object to be detected (pedestrian) is input from an external device such as a car navigation device installed in the vehicle.

Next, in an existence probability calculation unit 105, an existence probability of an object to be detected (pedestrian) in the image captured by the right image capture unit 102 is calculated based on a scene of a subsequent image acquired in the scene analysis unit 103 and the information for calculating the existence probability acquired in the external information acquisition unit 104.

Next, if the pedestrian existence probability is higher than a predetermined value, or for a portion in the image in which the pedestrian existence probability is higher than a predetermined value, a process priority change unit 106 changes a process priority so that the pedestrian sensing process is executed with priority over other objects to be detected (a preceding vehicle, a sign, a lane, etc.).

In a parameter changing unit 107, the sensing process parameters are changed so that the pedestrian sensing process in a portion in which the pedestrian existence probability is high is executed in more detail. In a scene in which the pedestrian existence probability is high, the exposure control parameters of the camera (right image capture unit 102) are changed to make adjustments so as to acquire an image in which a pedestrian can be easily sensed. Further, the image processing parameters of a portion in which the pedestrian existence probability is high within the image acquired by the right image capture unit 102 are changed to produce an image in which a pedestrian can be easily detected.

In a vehicle speed determination unit 108, in a scene in which the pedestrian existence probability is higher than a predetermined value, a command for executing speed control by suppressing acceleration of the vehicle is generated and output to a vehicle speed control device.

Meanwhile, in a distance calculation unit 103, an image captured by the left image capture unit 101 and an image captured by the right image capture unit 102 are input, and a distance to an object is calculated from a deviation in the images between the same object captured by the left image capture unit 101 and the right image capture unit 102. In an object-to-be-sensed sensing unit 110, a process is executed to sense an object to be sensed (pedestrian) using the prior image from the right image capture unit 102 and the distance information to the object calculated in the distance calculation unit 109. Therein, the sensing process is executed based on the priority that was previously changed by the process priority change unit 106, and the sensing process is executed using the parameters changed in the parameter changing unit 107.

Next, the processes executed in the scene analysis unit 103 of the stereo camera 100, which is the object sensing device, will be explained.

Figure 2:
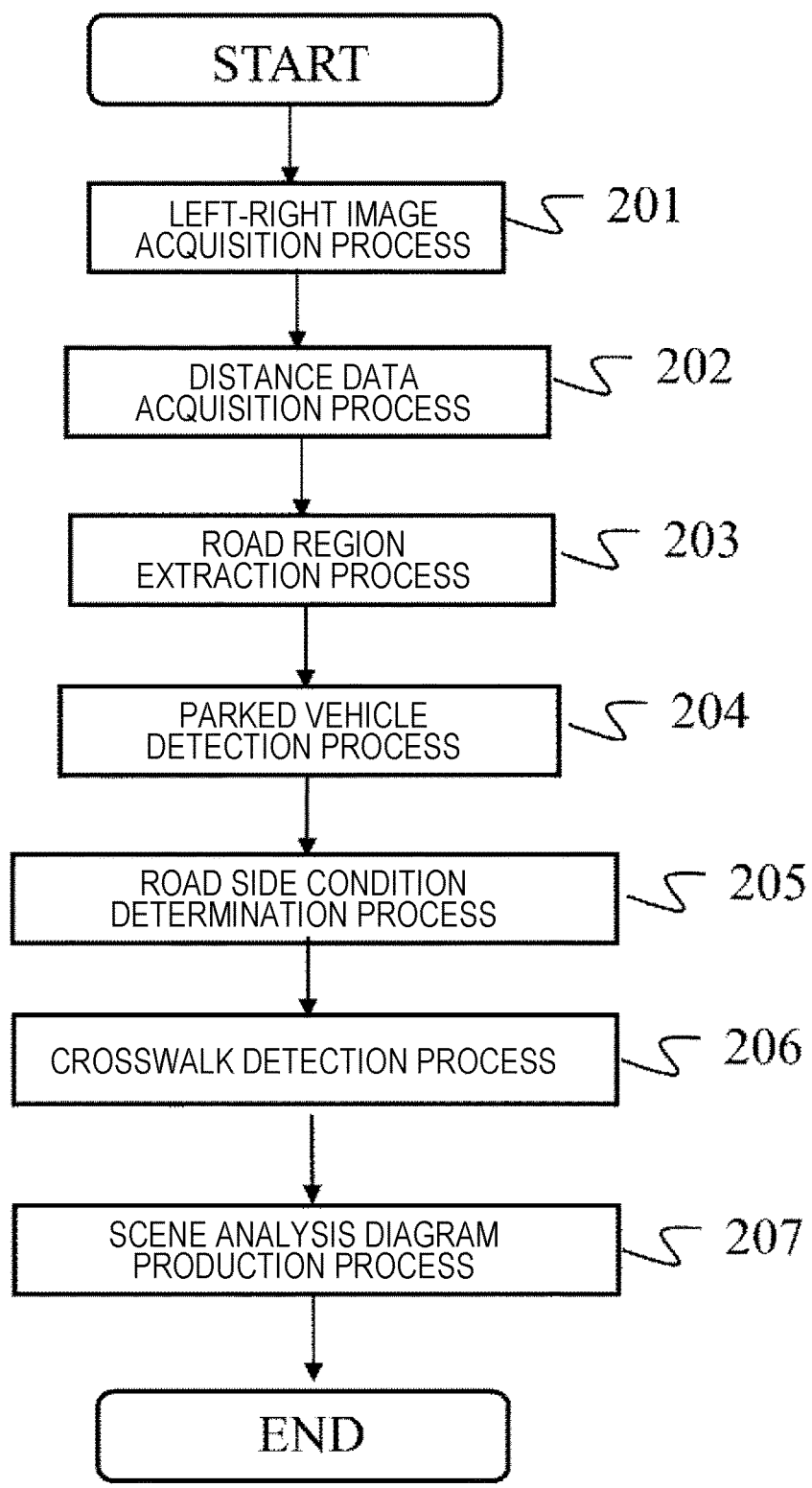
FIG. 2 illustrates a processing flow in a scene analysis unit of the object sensing device of the present invention.

FIG. 2 is a processing flow that is executed in the scene analysis unit 103 of the stereo camera 100.

First, in a left-right image acquisition process 201, images of the front of the vehicle captured by the left image capture unit 101 and the right image capture unit 102 of the stereo camera 100 are acquired. Next, in a distance data acquisition process 202, data regarding the distance information of the images capturing the front of the vehicle that was calculated in the distance calculation unit 109 of the stereo camera 100 is acquired. The details of the distance calculation unit 109 will be explained later.

Next, in a road region extraction process 203, a road region in the image is extracted using the two images of the front of the vehicle captured by the left image capture unit 101 and the right image capture unit 102 that were acquired in the left-right image acquisition process 201. A road region is the portion outlined by the dotted line (road region 301) in the image capturing the front of the vehicle (processing image 300 in FIG. 3), excluding other vehicles (parked vehicle 302), structures outside the road (guard rail or shrubbery 303) or (sidewalk without guard rail 304), etc., and is a region in which the vehicle can travel.

The road region 301 can be extracted from the two images captured by the stereo camera 100 by the method disclosed in JP 2005-217883 A.

Next, in a parked vehicle detection process 204, a parked vehicle 302 is detected from the processing image 300 capturing the front of the vehicle. In order to detect the parked vehicle 302 from the processing image 300, first, the size of three-dimensional objects that exist is calculated in regions outside of the road region 301 previously extracted in the road region extraction process 203 using the distance information previously acquired in the distance data acquisition process 202.

Herein, the distance information is the distance from the stereo camera 100 (vehicle) of objects captured in each pixel of the processing image 300. From this distance information, for example, a vehicle height 305, a vehicle width 306, and a vehicle depth 307 of the parked vehicle 302 in FIG. 3 can be calculated.

Next, among the three-dimensional objects whose size was calculated, those having height, width, and depth values near those of a vehicle are extracted. With regard to the height, width, and depth values of a vehicle, the value ranges of height, width, and depth of vehicles in the market are investigated in advance, and if the height, width, and depth values of a three-dimensional object are within these ranges, then the object is deemed to have a size equivalent to that of a vehicle.

Next, it is determined whether a side surface (vehicle side surface 308 in FIG. 3) of the three-dimensional object equivalent to a vehicle extracted previously has a texture similar to that of a vehicle. In this determination method, the textures of side surfaces of vehicles in the market are learned in advance, and it is determined whether the vehicle side surface in the processing image 300 and this learned data are similar. If it is determined that the three-dimensional object is a vehicle as a result of the vehicle side surface determination, it is then determined whether the vehicle is stopped.

In order to determine whether the vehicle is stopped, the processes indicated in the processing flow of FIG. 2 are similarly executed for the images of the previous frame and the frame before the previous frame, and a movement trajectory is calculated regarding where the same vehicle detected in the frame before the previous frame and the previous frame has moved in the image.

At this time, in determining whether the same vehicle exists in the frame before the previous frame, the previous frame, and the current frame, the vehicle side surface textures in each frame are compared using the vehicle side surface texture used when previously determining whether the three-dimensional object is a vehicle, and it is determined to be the same vehicle if the similarly of the side surface textures is high. Finally, the movement trajectory in the frame before the previous frame, the previous frame, and the current frame of the vehicle in the image calculated previously is compared to the speed of the host vehicle, and it is determined that the vehicle in the image is stopped if the movement of the background of the processing image 300 estimated from the speed of the host vehicle matches the movement of the trajectory of the vehicle in the image.

By the above-described processes, the parked vehicle 302 can be detected from the processing image 300.

Next, in a road side condition determination process 205, the attributes of the road shoulders outside of the road region 301 previously extracted in the road region extraction process 203 besides the portion of the parked vehicle 302 previously detected in the parked vehicle detection process 204 are determined. The attributes include the guard rail or shrubbery 303, a building 309, and the sidewalk without guard rail 304. Herein, in determining whether an object is a guard rail or shrubbery 303, the size of three-dimensional objects that exist is calculated using the distance information previously acquired in the distance data acquisition process 202 in regions outside of the road region 301 previously extracted in the road region extraction process 203 besides the portion of the parked vehicle 302 previously detected in the parked vehicle detection process 204.

Herein, the distance information is the distance from the stereo camera 100 (vehicle) of objects captured in each pixel of the processing image 300. From this distance information, the height of the three-dimensional objects is estimated. As a result, if the height of a three-dimensional object is within a certain fixed value, it is determined that the three-dimensional object is a guard rail or shrubbery. The certain fixed value is prepared as learned data by learning data regarding a typical guard rail and shrubbery in advance.

In determining whether an object is a building 309, the size of three-dimensional objects that exist is calculated using the distance information previously acquired in the distance data acquisition process 202 in regions outside of the road region 301 previously extracted in the road region extraction process 203 besides the portion of the parked vehicle 302 previously detected in the parked vehicle detection process 204 and the portion determined to be a guard rail or shrubbery 303 in the road side condition determination process 205. As a result, if the height of a three-dimensional object is equal to or greater than a certain fixed value, it is determined that the three-dimensional object is a building. The certain fixed value is prepared as learned data by learning data regarding the height of a typical building in advance.

In determining whether there is a sidewalk with no guard rail 304, first image processing is executed outside of the road region 301 to extract a road border line 310 (solid white line). The road border line can be detected by the method disclosed in JP 2012-155399 A. If no stationary three-dimensional objects exist between the road border line 310 that was detected and the portion that was determined to be the building 309 in the road side condition determination process 205, then it is determined that the sidewalk with no guard rail 304 exists. In determining whether a three-dimensional object is a stationary three-dimensional object, the trajectory of the target three-dimensional object in the frame before the previous frame, the previous frame, and the current frame is calculated, and if this trajectory matches the movement of the background of the processing image 300 estimated from the speed of the host vehicle, the three-dimensional object is determined to be a stationary three-dimensional object.

Next, in a crosswalk detection process 206, it is determined whether there are road surface markings of a crosswalk within the road region 301 previously extracted in the road region extraction process 203. A crosswalk can be detected from within the road region 301 by the method disclosed in JP 2011-192071 A, etc.

Figure 3:
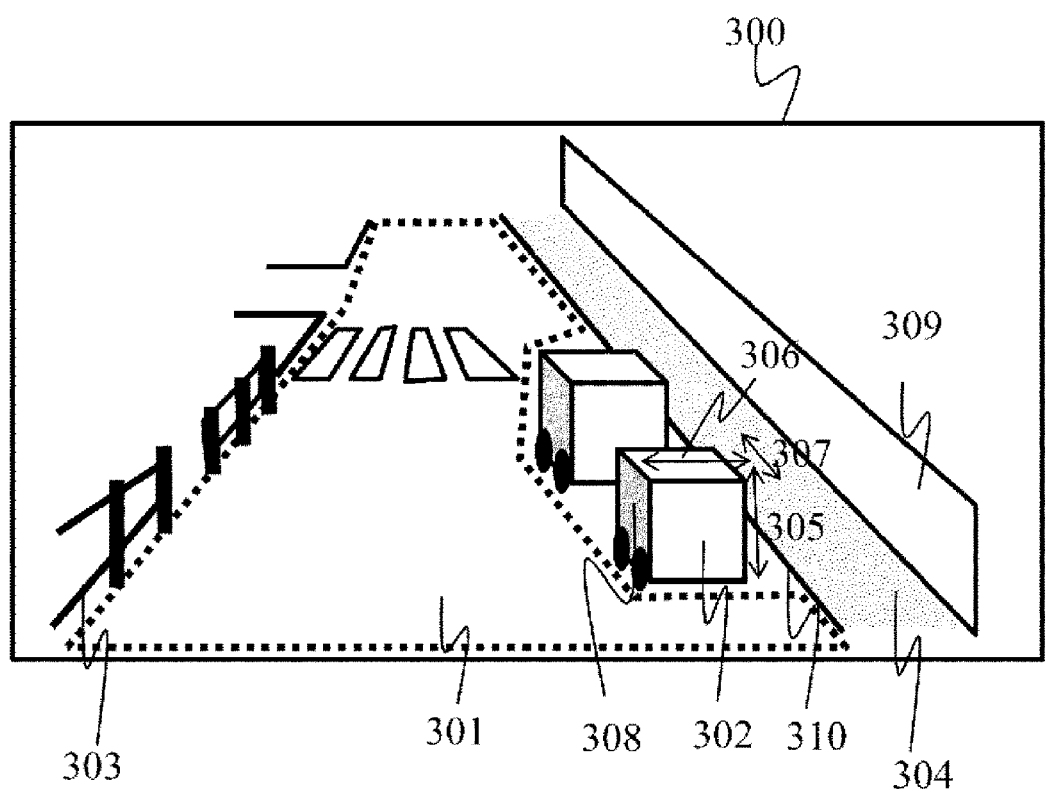
FIG. 3 schematically illustrates a road region extraction process of the object sensing device of the present invention.

Finally, in a scene analysis diagram production process 207, a scene analysis diagram of the road region 301 as shown in FIG. 3 is produced. A scene analysis diagram is a diagram that describes what kind of objects exist in which regions within an image as shown in FIG. 4 based on the results extracted in the parked vehicle detection process 204, the road side condition determination process 205, and the crosswalk detection process 206 described above.

Figure 4:
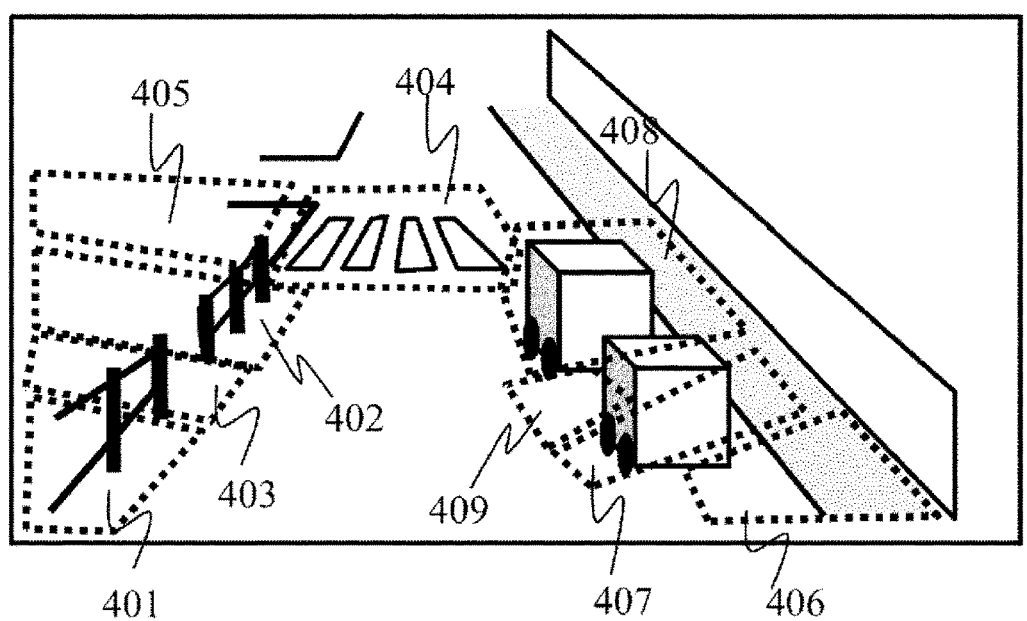
FIG. 4 schematically illustrates a scene analysis diagram of the object sensing device of the present invention.

FIG. 4 illustrates guard rail or shrubbery regions 401 and 402, a gap region 403 between a guard rail or shrubbery, a crosswalk region 404, sidewalk regions without a guard rail 405 and 406, parked vehicle regions 407 and 408, and a gap region 409 between parked vehicles.

Next, the processes executed in the external information acquisition unit 104 of the stereo camera 100 will be explained.

Herein, external information is a car navigation device installed in the vehicle or a device outside the vehicle such as a sensor or other vehicle. A device outside the vehicle acquires information by a road-to-vehicle communication device called DSRC (Dedicated Short Range Communication), a mobile telephone, or a wireless LAN.

Herein, an example of acquiring information from a car navigation device will be explained. Attributes of a place where the host vehicle is traveling are delivered to the stereo camera 100 from the car navigation device.

Herein, the attributes of a place where the host vehicle is traveling are the attributes of urban area, residential area, commercial facility, school, road with few vehicles, and place where the density of intersection is high, which are places where the probability that a pedestrian exists is high, and conversely, the attributes of highway, elevated road, road with many vehicles, place with few buildings, mountainous area, and road with few intersections, which are places where the probability that a pedestrian exists is low.

The car navigation device specifies the location of the host vehicle on map data within the car navigation device based on GPS (Global Positioning System) position data, and transmits the above-described place attributes regarding the probability of excessive pedestrians around the host vehicle to the stereo camera 100.

Next, the processing in the existence probability calculation unit 105 of the stereo camera 100 will be explained in detail.

In the existence probability calculation unit 105, an existence probability regarding whether the possibility that a pedestrian exists in the image captured by the right image capture unit 102 is high or low is calculated based on the image scene acquired in the scene analysis unit 103 and the information regarding the attributes of the place where the host vehicle is traveling acquired in the external information acquisition unit 104 as described above.

Herein, in calculating the existence probability, learned data as shown in FIG. 5 is prepared based on the results of investigations conducted in advance, and the pedestrian existence probability is calculated by referring to this learned data. In the table of learned data shown in FIG. 5, image scene types 501 are given on the vertical axis, including guard rail or shrubbery, gaps between guard rail or shrubbery, crosswalks, sidewalks without guard rail, parked vehicles, and gaps between parked vehicles, which are elements of the scene captured by the stereo camera 100 in the scene analysis diagram production process 207 among the processes executed in the scene analysis unit 103 of the stereo camera 100.

Meanwhile, the horizontal axis 502 shows attributes of the places where the vehicle is traveling acquired in the external information acquisition unit 104 of the stereo camera 100, including urban area, residential area, commercial facility, school, highway, elevated road, mountainous area, and road with few intersections.

The numbers listed in the table as the values 503 of the pedestrian existence probability indicate the pedestrian existence probability. For example, if the image scene is a guard rail/shrubbery and the place attribute is an urban area, the probability that a pedestrian exists is 10%.

Herein, in calculating the probability of the values 503 of the pedestrian existence probability, pre-acquired images are investigated to actually check the probability that a pedestrian exists, and thereby probability values are prepared as empirical values.

Next, a pedestrian existence probability is assigned to the scene analysis diagram of FIG. 4 produced in the scene analysis diagram production process 207 executed in the scene analysis unit 103 of the stereo camera 100 based on the learned data regarding the pedestrian existence probability as shown in FIG. 5. Considering an example when the place attribute of the scene acquired in the external information acquisition unit 104 of the stereo camera 100 is a commercial facility, for example, referring to the table in FIG. 5, the pedestrian existence probability in the gap region 403 between a guard rail or shrubbery is 90% based on a value 504 of the pedestrian existence probability in FIG. 5. Similarly, with regard to the other guard rail or shrubbery regions 401 and 402, the crosswalk region 404, the sidewalk regions without a guard rail 405 and 406, the parked vehicle regions 407 and 408, and the gap region 409 between parked vehicles, a pedestrian existence probability is assigned to each of the above in the scene analysis diagram of FIG. 4 as shown in FIG. 6 referring to the existence probabilities from the table in FIG. 5.

In FIG. 6, the regions 601 indicated with a thick solid line frame are regions with a pedestrian existence probability of 90% (the regions 403, 404, 405, 406, and 409 in FIG. 6), the regions 602 indicated with a thin solid line frame are regions with a pedestrian existence probability of 60% (the regions 407 and 408), and the regions 603 indicated with a thin dotted line frame are regions with a pedestrian existence probability of 30% (the regions 401 and 402).

Next, the processes executed in the process priority change unit 106 of the stereo camera 100 will be explained in detail.

In the process priority change unit 106, if the pedestrian existence probability is higher than a predetermined value, or for a portion in the image in which the pedestrian existence probability is higher than a predetermined value, the process priority is changed so that the pedestrian sensing process is executed with priority over other objects to be detected (a preceding vehicle, a sign, a lane, etc.).

Figure 7:
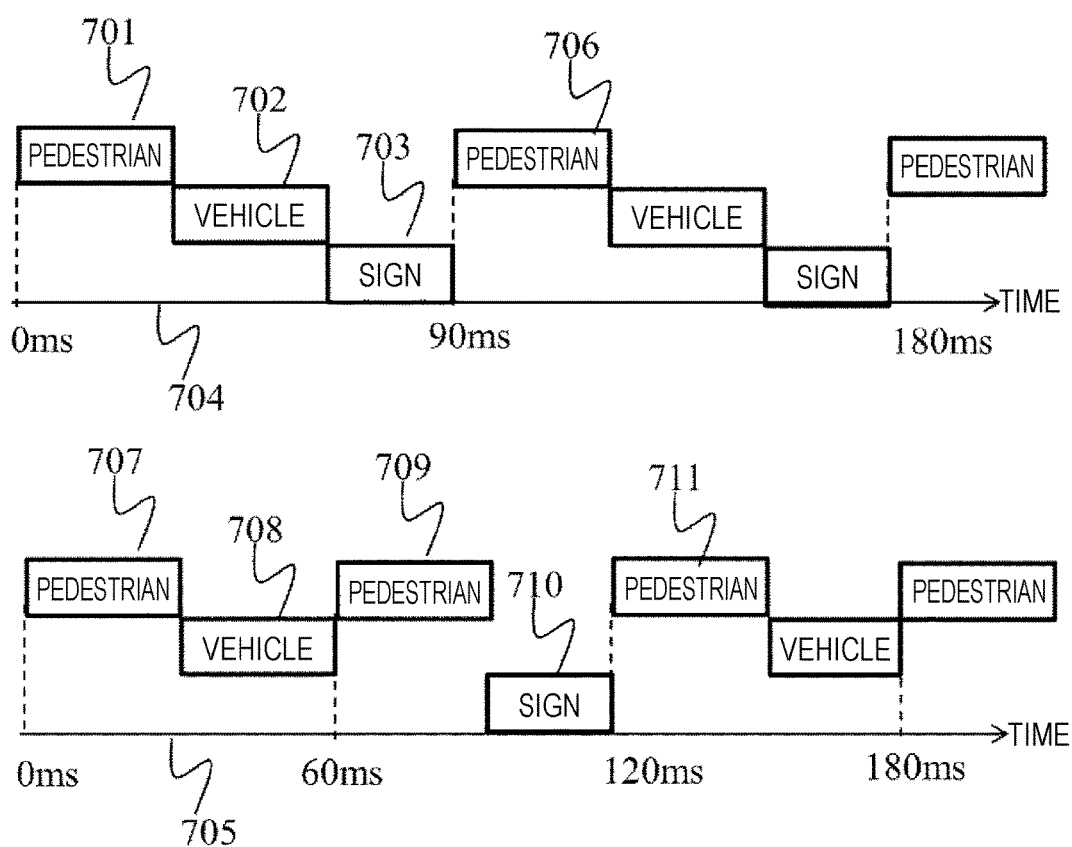
FIG. 7 schematically explains a process priority change unit of the object sensing device of the present invention.

FIG. 7 shows an overview of the process priority changing. As a result of calculating the pedestrian existence probability of the current scene in the existence probability calculation unit 105 of the stereo camera 100, if there is a region in the scene in which the probability is at or above a certain fixed value, the process priority is changed as shown in FIG. 7. FIG. 7 illustrates a process schedule 704 before the priority change and a process schedule 705 before the priority change.

In the process schedule 704 before the priority change, considering an example in which a pedestrian sensing process, a vehicle sensing process, and a sign sensing process are executed in the stereo camera 100, a pedestrian sensing process 701, a vehicle sensing process 702, and a sign sensing process 703 are all executed sequentially in a period of 90 ms, such that the pedestrian sensing process 701 is executed first at 0 ms, the vehicle sensing process 702 is executed next, the sign sensing process 703 is executed last, and then a pedestrian sensing process 706 is executed again at 90 ms.

As a result of calculating the pedestrian existence probability of the current scene, if there is a region in the scene in which the probability is at or above a certain fixed value, the process priority is changed to the process schedule 705 before the priority change of FIG. 7. In other words, the process priority is changed such that a pedestrian sensing process 707 is executed first at 0 ms, a vehicle sensing process 708 is executed next, then a pedestrian sensing process 709 is executed again, a sign sensing process 710 is executed last, and then a pedestrian sensing process 711 is executed again at time 120 ms.

Thereby, the pedestrian sensing process is executed in a 60 ms period, and the vehicle sensing process and the sign sensing process are executed in a period of 120 ms. By repeatedly executing the pedestrian sensing process with priority, the pedestrian sensing performance can be improved.

Next, the processes executed in the parameter changing unit 107 of the stereo camera 100 will be explained in detail.

Figure 8:
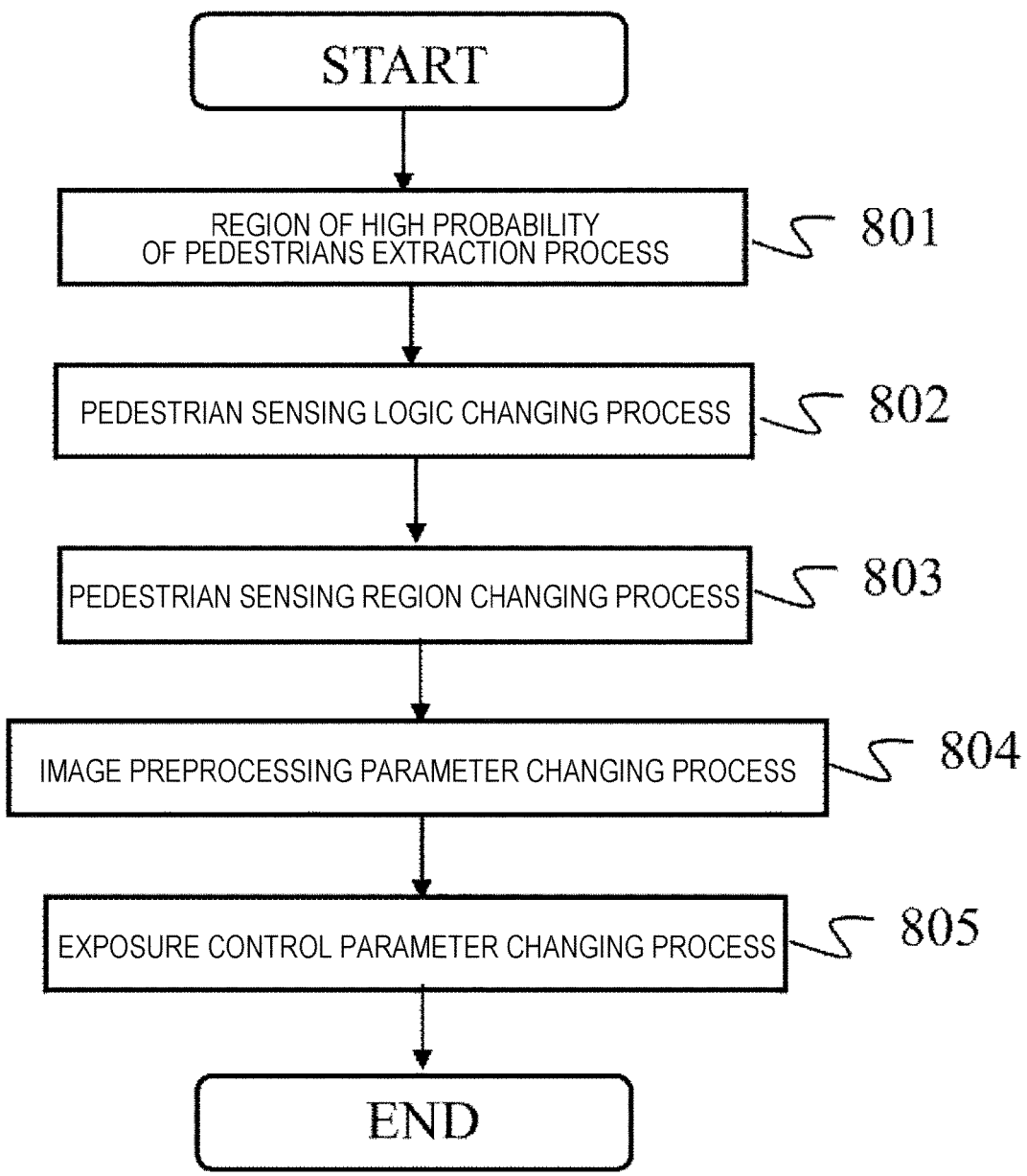
FIG. 8 illustrates a processing flow in a parameter changing unit of the object sensing device of the present invention.

FIG. 8 illustrates a processing flow of the processes that are executed in the parameter changing unit 107. First, in a region of high probability of pedestrians extraction process 801, the regions having an existence probability at or above a certain fixed value are extracted from the pedestrian existence probabilities (FIG. 6) calculated in the existence probability calculation unit 105 of the stereo camera 100. If the certain fixed value is 80%, the regions 601 indicated with a thick solid line frame in FIG. 6 (the regions 403, 404, 405, 406, and 409) will be extracted.

Next, in a pedestrian sensing logic changing process 802, if there are existence probability values that are at or above the certain fixed value among the pedestrian existence probabilities (FIG. 6) calculated in the existence probability calculation unit 105 of the stereo camera 100, a logic of the pedestrian sensing process is changed so that the pedestrian sensing process in the regions with a high pedestrian existence probability extracted previously in the region of high probability of pedestrians extraction process 801 is executed in more detail. Herein, in the pedestrian sensing process, pedestrians can be detected by making a determination in comparison with data resulting from learning many pedestrian images using an image feature quantity called HOG (Histograms of Oriented Gradients), which is described in the following Non-Patent Literature: "N. Dalal and B. Triggs, 'Histograms of Oriented Gradients for Human Detection', IEEE Symposium on Intelligent Vehicle, pp. 206-212, June, 2006". In this process, the determination process can be made more detailed by adding another sensing process using a second feature quantity other than HOG, thereby improving the detection performance.

Further, in this process, the pedestrian sensing performance can be improved by, when making a determination in comparison to data that has been learned in advance using image feature quantities, lowering the determination threshold almost to the point of oversensitivity, and then adding a detailed determination regarding whether the movement of each part of the pedestrian, i.e. the head, shoulders, and legs of the pedestrian, resemble that of a pedestrian.

Next, in a pedestrian sensing region changing process 803, the regions having an existence probability at or above the certain fixed value among the pedestrian existence probabilities (FIG. 6) calculated in the existence probability calculation unit 105 of the stereo camera 100 are extracted and set as processing regions in which a pedestrian viewpoint is executed with priority. For example, in FIG. 6, settings are implemented so that the pedestrian sensing process is executed at a high frequency of a period of 60 ms for the regions including the regions 601 and 602 in which the pedestrian existence probability is 60% or greater, whereas the pedestrian sensing process is not executed or executed at a low frequency in the other regions.

Next, in an image preprocessing parameter changing process 804, the regions having an existence probability at or above the certain fixed value among the pedestrian existence probabilities (FIG. 6) calculated in the existence probability calculation unit 105 of the stereo camera 100 are extracted, and preprocessing parameters for these regions in which the pedestrian existence probability is high are changed to produce images in which a pedestrian can be easily sensed. Herein, in a case in which the image is overexposed in white or darkened in portions where the pedestrian existence probability is high such that it is difficult to detect a pedestrian, the entire image is subjected to gradation correction so that pedestrians are displayed with good contrast. Alternatively, gradation correction is conducted only in portions including the regions in which the pedestrian existence probability is at or above the certain fixed value that were previously extracted so that pedestrians are displayed with good contrast.

Finally, in an exposure control parameter changing process 805, in a scene in which the pedestrian existence probability is high, the exposure control parameters of the left image capture unit 101 and the right image capture unit 102 of the stereo camera 100 are changed and adjusted so as to acquire an image in which a pedestrian can be easily sensed. Herein, the regions having an existence probability at or above the certain fixed value among the pedestrian existence probabilities (FIG. 6) calculated in the existence probability calculation unit 105 of the stereo camera 100 are extracted and the brightness in these portions of the image is extracted, and then the exposure control parameters are changed so that the exposure time is shortened if the portions are bright and the exposure time is lengthened if the portions are dark.

Next, the processes executed in the vehicle speed determination unit 108 of the stereo camera 100 will be explained.

In the vehicle speed determination unit 108, in a scene in which the pedestrian existence probability is high, a command for executing speed control by suppressing acceleration of the vehicle is generated and output to a vehicle speed control device.

In other words, if there are existence probability values that are at or above the certain fixed value among the pedestrian existence probabilities (FIG. 6) calculated in the existence probability calculation unit 105 of the stereo camera 100, even if the vehicle speed is lower than a user set speed of an ACC (Adaptive Cruise Control) of the vehicle, control is performed to suppress the vehicle speed without allowing the vehicle to accelerate to the set speed.

Further, the speed limit of the road where the vehicle is currently traveling is acquired from the car navigation device in the external information acquisition unit 104 of the stereo camera 100, and if the vehicle speed is higher than the speed limit, deceleration control is performed to decelerate the vehicle to the speed limit.

Next, the processes executed in the distance calculation unit 109 of the stereo camera 100 will be explained in detail using the flowchart of FIG. 9.

Figure 9:
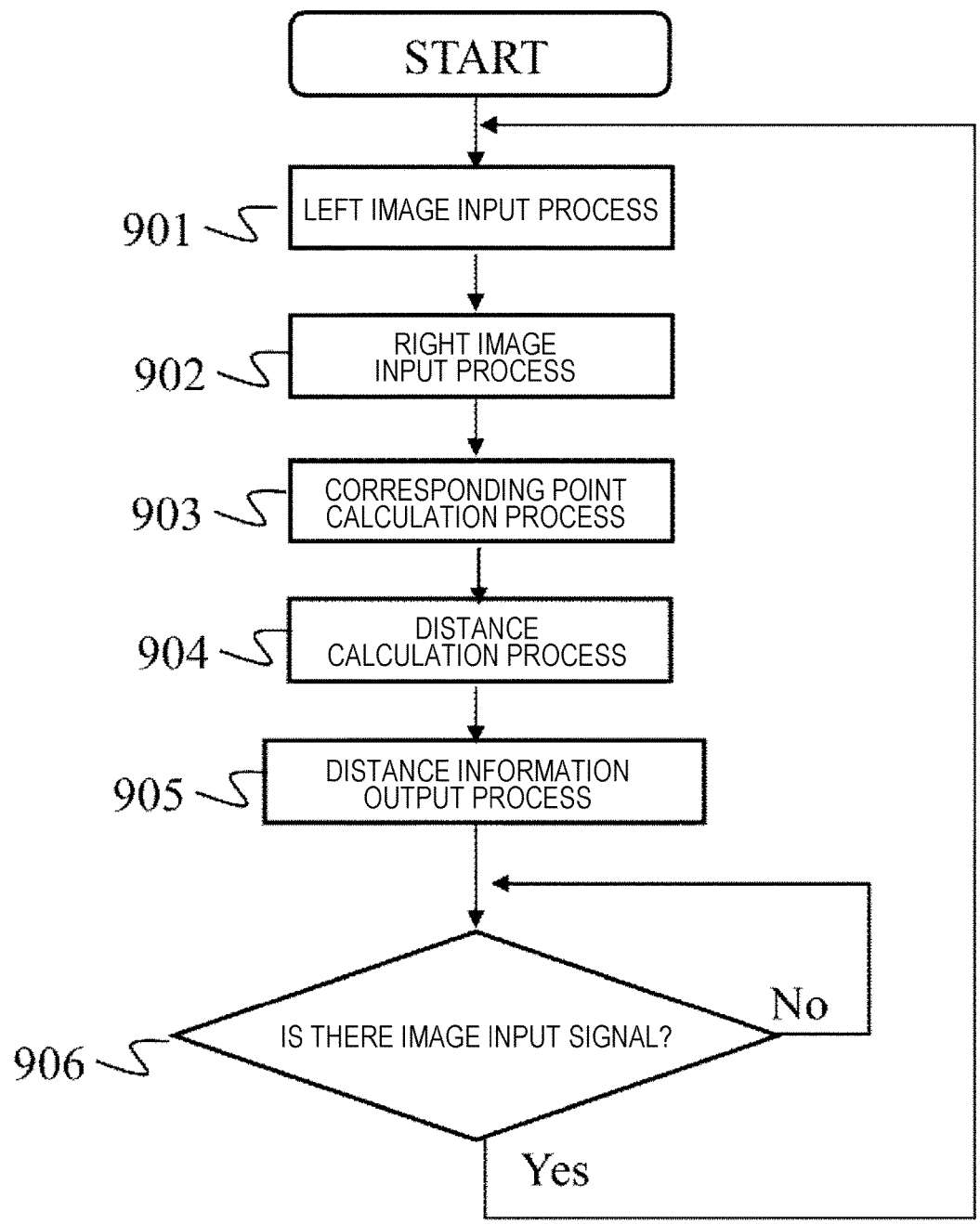
FIG. 9 illustrates a processing flow in a distance calculation unit of the object sensing device of the present invention.

In the flowchart of FIG. 9, first, in a left image input process 901, image data captured by the left image capture unit 101 is received. Next, in a right image input process 902, image data captured by the right image capture unit 102 is received. Herein, the left image input process 901 and the right image input process 902 can be simultaneously executed as parallel processes.

Figure 10:
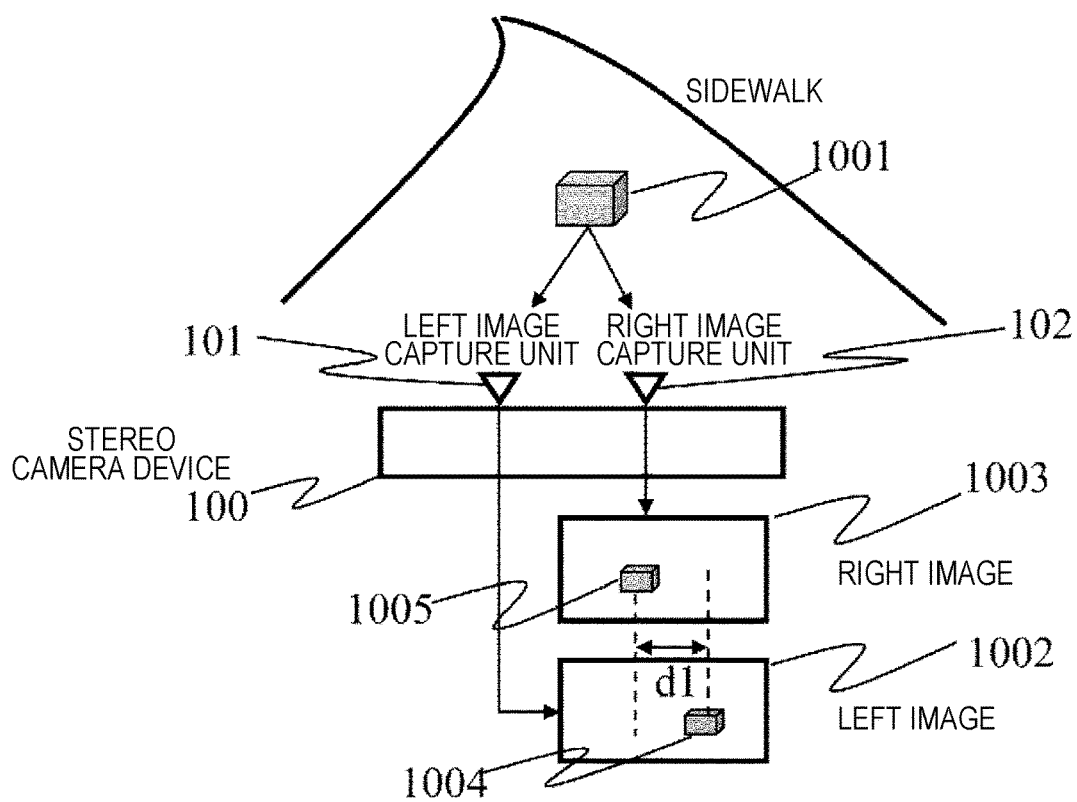
FIG. 10 explains corresponding points of left and right images of the object sensing device of the present invention.

Next, in a corresponding point calculation process 903, the two left and right images acquired in the left image input process 901 and the right image input process 902 are compared, and portions where the same object is captured are specified. As shown in FIG. 10, when an object 1001, which is an object on the travel path, is captured by the stereo camera 100, the images captured by the left image capture unit 101 and the right image capture unit 102 appear as the left image 1002 and the right image 1003. Herein, the identical object 1001 is captured at an object position 1004 in the left image 1002 and is captured at an object position 1005 in the right image 1003, and thus a deviation d1 in the horizontal direction occurs between the images. Therefore, it is necessary to specify where the object captured at the object position 1004 of the left image 1002 is captured in the right image 1003.

A method for specifying where the specific object captured in the left image 1002 is captured in the right image 1003 will now be explained using FIG. 11.

Figure 11:
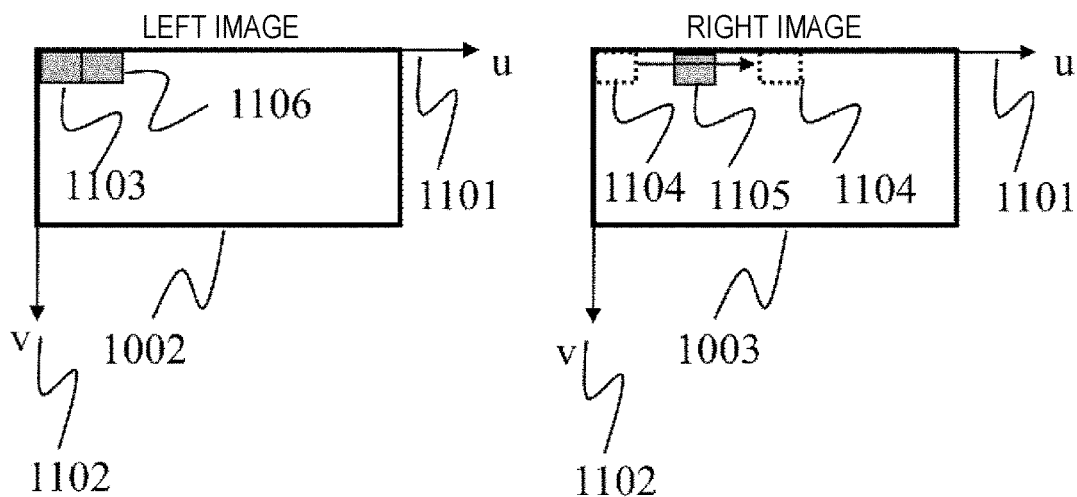
FIG. 11 explains how to find the corresponding points of the left and right images of the object sensing device of the present invention.

In FIG. 11, in the coordinate system of the left image 1002 and the right image 1003, the horizontal axis is a u-axis 1101 and the vertical axis is a v-axis 1102. First, in the left image 1002, a rectangular region 1103 defined by (u1, v1), (u1, v2), (u2, v1), (u2, v2) in the uv coordinate system is set.

Next, in the right image 1003, the U value is increased from u=0 to u=u3 so that a region defined by (U, v1), (U, v2), (U+(u2−u1), v1), (U+(u2−u1), v2) is scanned up to a rectangular region 1104 in the rightward direction of the image. When scanning, the correlation values of the image within the rectangular region 1103 and the image within the rectangular region 1104 are compared, and it is determined that an object which is identical to the object captured in the rectangular region 1103 is captured at a position (u4, v1), (u4, v2), (u4+(u2−u1), v1), (u4+(u2−u1), v2) of a rectangular region 1105 in the right image 1003 where the correlation with the rectangular region 1103 of the left image 1002 is the highest. Herein, the pixels within the rectangular region 1103 are regarded as corresponding to the pixels within the rectangular region 1105. Herein, when scanning the rectangular region 1104 of the right image 1003, if there are no rectangles in which the correlation value is at or above a certain fixed value, it is determined that there are no corresponding points in the right image 1003 that correspond to the rectangular region 1103 of the left image 1002.

Next, the rectangular region 1103 of the left image 1002 is shifted to the position of a rectangular region 1106, and the same process is executed.

In this way, rectangular regions in the left image 1002 are scanned throughout the entire left image 1002, and corresponding points within the right image 1003 are found for all of the pixels in the left image 1002. If no corresponding points are found, then it is determined that no corresponding points exist.

Next, a distance calculation process 904 in the flowchart of FIG. 9 is executed.

In the distance calculation process 904, with regard to the corresponding points of the left image 1002 and the right image 1003 capturing the same object found in the corresponding point calculation process 903 described above, the distance from the stereo camera 100 of the corresponding points is calculated.

First, using FIG. 12, a method for calculating a distance from the camera of an object point 1201 in the left image 1002 and the right image 1003 will be explained.

Figure 12:
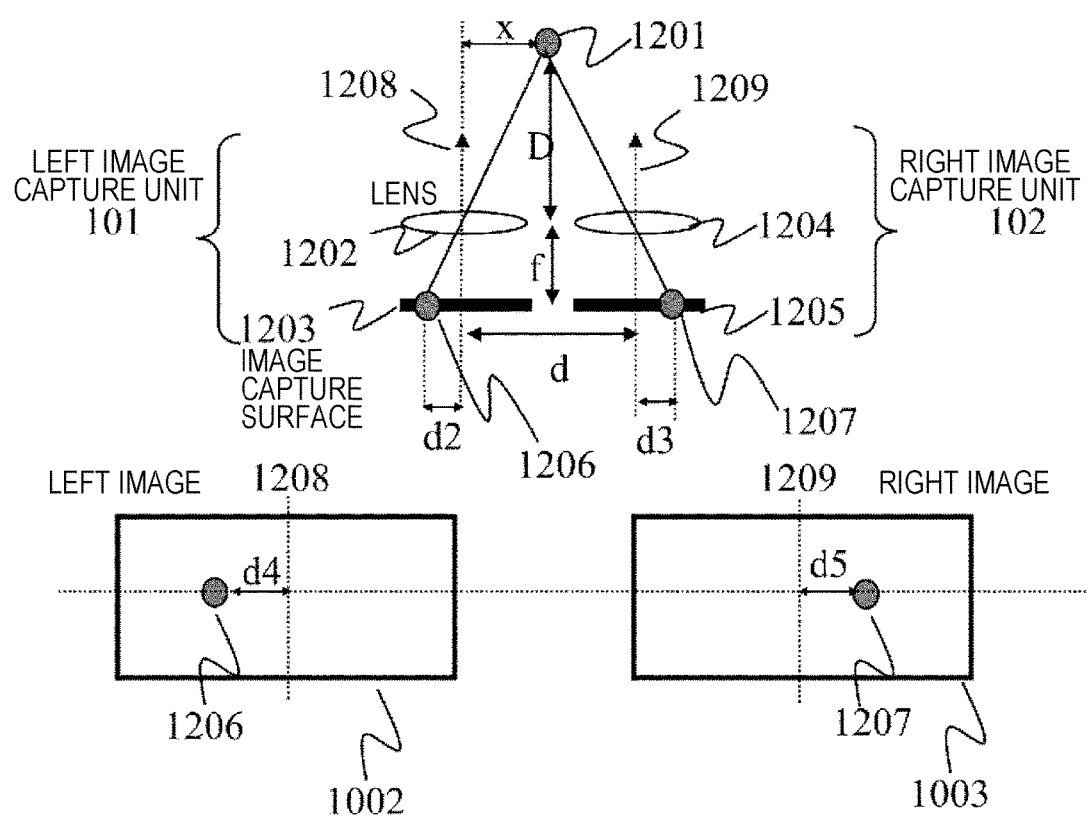
FIG. 12 explains a method for distance calculation of the object sensing device of the present invention.
Figure 13:
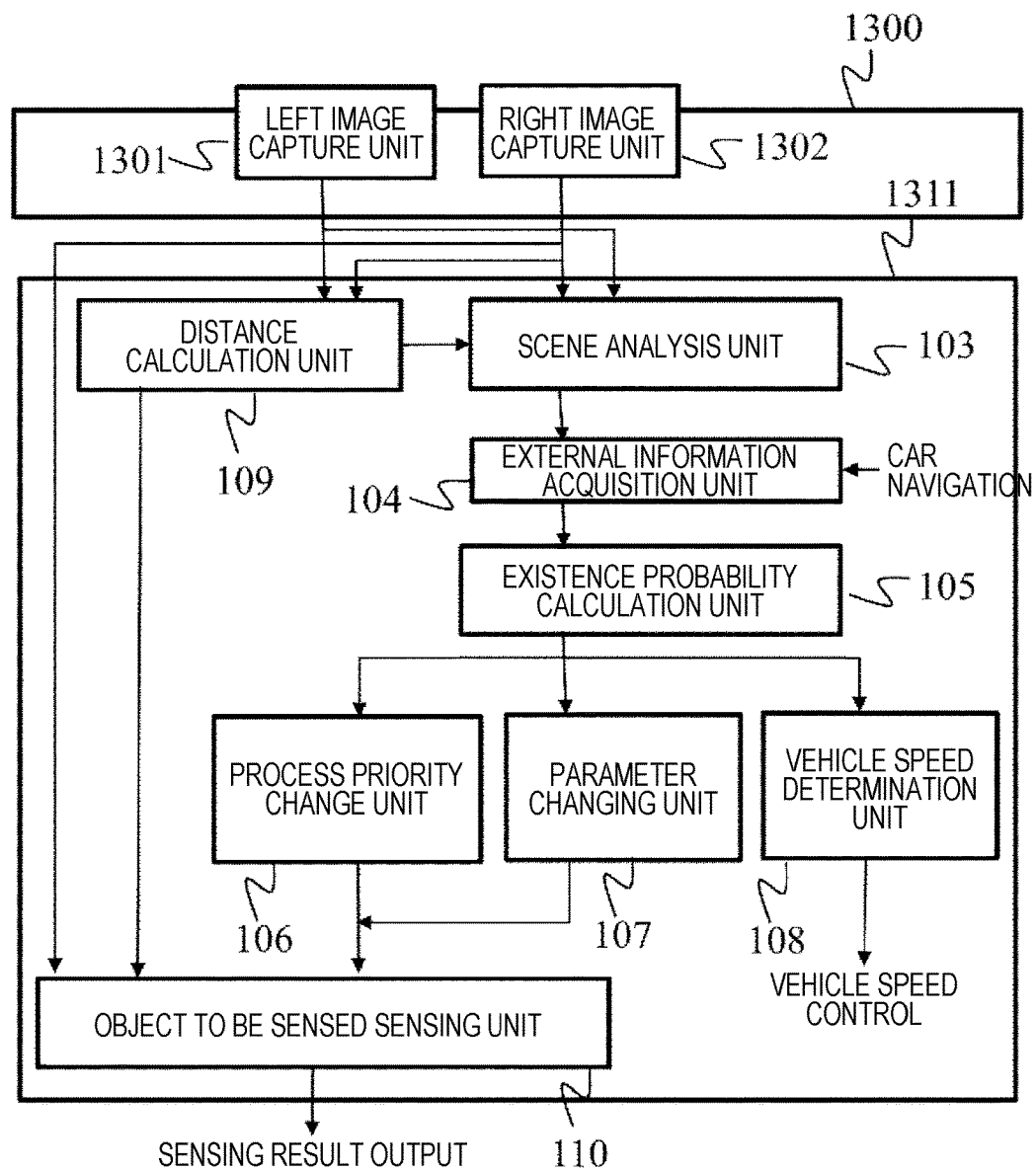
FIG. 13 illustrates another example of the constitution of the object sensing device according to the present invention.

In FIG. 12, the left image capture unit 101 is a camera having focal length f and optical axis 1208 of the left image capture unit, and consisting of a lens 1202 and an image capture surface 1203, and the right image capture unit 102 is a camera having focal length f and optical axis 1209 of the right image capture unit, and consisting of a lens 1204 and an image capture surface 1205. The object point 1201 in front of the cameras is captured at a point 1206 (a distance d2 from the optical axis 1208) on the image capture surface 1203 of the left image capture unit 101, and becomes the point 1206 (a position of d4 pixels from the optical axis 1208) in the left image 1002. Similarly, the object point 1201 in front of the cameras is captured at a point 1207 (a distance d3 from the optical axis 1209) on the image capture surface 1205 of the right image capture unit 102, and becomes the point 1207 (a position of d5 pixels from the optical axis 1209) in the right image 1003.

In this way, the object point 1201 of the same object is captured at a position of d4 pixels toward the left from the optical axis 1208 in the left image 1002, and is captured at a position of d5 pixels toward the right from the optical axis 1209 in the right image 1003. Thus, a parallax of d4+d5 pixels is generated.

Therefore, if the distance between the optical axis 1208 of the left image capture unit 101 and the object point 1201 is x, a distance D from the stereo camera 100 to the object point 1201 can be calculated by the following formulas.

From the relationship between the object point 1201 and the left image capture unit 101 d2:f=x:D From the relationship between the object point 1201 and the right image capture unit 102 d3:f=(d−x):D Thus, D=f×d/(d2+d3)=f×d/{(d4+d5)×a}. Herein, a is the size of the image capture elements of the image capture surface 1203 and the image capture surface 1205.

The distance calculation described above is carried out for all of the corresponding points calculated in the corresponding point calculation process 903 described above. As a result, a distance image expressing the distance from the stereo camera 100 to the object can be found.

In a distance information output process 905 of the flowchart of FIG. 9, this distance image is output and saved.

Finally, at a branch 906 of the flowchart of FIG. 9, if there are image input signals from the left image capture unit 101 and the right image capture unit 102, the process returns to the left image input process 901. At the branch 906, if there are no image input signals from the left image capture unit 101 and the right image capture unit 102, the process enters standby until image input signals are input into the distance calculation unit 109.

Finally, the processes executed in the object-to-be-sensed sensing unit 110 of the stereo camera 100 will be explained. In the object-to-be-sensed sensing unit 110, each sensing process is initiated following the process schedule shown in the process schedule 705 before the priority change of FIG. 7 determined in the process priority change unit 106 of the stereo camera 100 as described above. In the example of FIG. 7, a pedestrian sensing process, a vehicle sensing process, and a sign sensing process are executed sequentially. The results of sensing are output from the stereo camera 100 to an external device.

Embodiment 2

Here, another embodiment in which the present invention is applied to a system for sensing a pedestrian using images of a stereo camera installed in a vehicle is shown in FIG. 1.

A stereo camera 1300, which is an image capture device, has a left image capture unit 1301 and a right image capture unit 1302. A processing device 1311 has the scene analysis unit 103, the external information acquisition unit 104, the existence probability calculation unit 105, the process priority change unit 106, the parameter changing unit 107, the vehicle speed determination unit 108, the distance calculation unit 109, and the object-to-be-sensed sensing unit 110. The processing content in each unit from the scene analysis unit 103 to the object-to-be-sensed sensing unit 110 is the same as that described in Embodiment 1.

In the present embodiment, the stereo camera 1300 and the processing device 1311 can be in separate housings. The stereo camera 1300 and the processing device 1311 are connected by a single or a plurality of signal lines, and the image captured by the left image capture unit 1301 and the image captured by the right image capture unit 1302 are sent to the processing device 1311.

REFERENCE SIGNS LIST

100 stereo camera
101 left image capture unit
102 right image capture unit
103 scene analysis unit
104 external information acquisition unit
105 existence probability calculation unit
106 process priority change unit
107 parameter changing unit
108 vehicle speed determination unit
109 distance calculation unit
110 object-to-be-sensed sensing unit
111 processing device
201 left-right image acquisition process
202 distance data acquisition process
203 road region extraction process
204 parked vehicle detection process
205 road side condition determination process
206 crosswalk detection process
207 scene analysis diagram production process

The invention claimed is:
1. An object sensing device, comprising:
an image capture unit that captures surroundings of a host vehicle; and
at least one processor that executes a sensing process of an object to be sensed from an image captured by the image capture unit to:
analyze a travel scene of the host vehicle;
change a sensing process priority of the object to be sensed based on the travel scene analyzed by the scene analysis unit;
sense the object to be sensed based on the changed sensing process priority, calculate an existence probability of the object to be sensed based on map information and the analyzed travel scene using pre-stored learned data in which travel scene types, place attributes, and existence probability values are associated.

2. The object sensing device according to claim 1, wherein the image capture unit comprises a left image capture unit and a right image capture unit, and
the at least one processor executes a sensing process of the object to be sensed from a left image captured by the left image capture unit and a right image captured by the right image capture unit.

3. The object sensing device according to claim 2, wherein the at least one processor:
calculates a distance to the object to be sensed from the left image and the right image; and
calculates an existence probability of the object to be sensed based on the travel scene analyzed by the scene analysis unit,
wherein the at least one processor changes the sensing process priority of the object to be sensed based on the calculated existence probability, and
executes a sensing process of the object to be sensed based on calculated distance information and the changed sensing process priority.

4. The object sensing device according to claim 3, wherein the at least one processor:
extracts a road region based on the left image, the right image, and the distance information;
detects a parked vehicle based on the left image, the right image, and the distance information;
determines attributes of places in regions outside of the road region based on the left image, the right image, and the distance information; and
detects a crosswalk based on the left image, the right image, and the distance information.

5. The object sensing device according to claim 1, wherein the at least one processor calculates an existence probability of the object to be sensed based on the analyzed travel scene, and
changes the sensing process priority of the object to be sensed based on the calculated existence probability.

6. The object sensing device according to claim 5, wherein the at least one processor generates and outputs a speed command for controlling a speed of the host vehicle based on the calculated existence probability.

7. The object sensing device according to claim 5, wherein the at least one processor changes exposure control parameters of the image capture unit based on the calculated existence probability.

8. The object sensing device according to claim 7, wherein if the object to be sensed is a pedestrian, the at least one processor:
extracts regions in which a possibility that a pedestrian exists is high from the calculated existence probability;
changes a pedestrian sensing logic that senses a pedestrian based on the regions in which a possibility that a pedestrian exists is high;
performs gradation correction on an image based on the regions in which a possibility that a pedestrian exists is high; and
extracts a brightness of an image from the regions in which a possibility that a pedestrian exists is high and changes exposure control parameters based on the brightness of the image.

9. The object sensing device according to claim 1, wherein the at least one processor:
acquires the map information, and
wherein the at least one processor changes the sensing process priority of the object to be sensed based on the calculated existence probability.

10. The object sensing device according to claim 1, wherein the image capture unit and the at least one processor are installed in an integrated housing or are installed in separate housings.

11. The object sensing device according to claim 1, wherein if a pedestrian existence probability is higher than a predetermined value, the at least one processor changes the sensing process priority so that a pedestrian sensing process is executed with priority over other objects to be detected.

12. The object sensing device according to claim 11, wherein the at least one processor changes sensing process parameters so that the pedestrian sensing process when the pedestrian existence probability is high is executed in detail.

13. The object sensing device according to claim 12, wherein if the pedestrian existence probability is higher than the predetermined value, a command for executing speed control by suppressing acceleration of the host vehicle is generated and output to a vehicle speed control device.

14. The object sensing device according to claim 13, wherein the pedestrian existence probability is calculated based on learned data, the learned data prepared based on one or more results of investigations conducted in advance.

15. The object sensing device according to claim 14, wherein the learned data is included in a table, wherein a vertical axis of the table includes image scene types and a horizontal axis includes one or more attributes places where the host vehicle is traveling.

16. The object sensing device according to claim 15, wherein the image scene types include one or more of: (i) guard rail or shrubbery, (ii) gaps between guard rail or shrubbery, (iii) crosswalks, (iv) sidewalks without guard rail, (v) parked vehicles, and (vi) gaps between parked vehicles, and wherein the one or more attributes places includes one or more of: (i) an urban area, (ii) a residential area, (iii) a commercial facility, (iv) a school, (v) highway, (vi) an elevated road, (vii) a mountainous area, and (viii) a road with few intersections.

17. The object sensing device according to claim 1, wherein the at least one processor changes sensing process parameters so that a pedestrian sensing process when a pedestrian existence probability is high is executed in detail.

18. The object sensing device according to claim 1, wherein if a pedestrian existence probability is higher than a predetermined value, a command for executing speed control by suppressing acceleration of the host vehicle is generated and output to a vehicle speed control device.

19. The object sensing device according to claim 1, wherein a pedestrian existence probability is calculated based on learned data, the learned data prepared based on one or more results of investigations conducted in advance.

20. The object sensing device according to claim 19, wherein the learned data is included in a table, wherein a vertical axis of the table includes image scene types and a horizontal axis includes one or more attributes places where the host vehicle is traveling.

21. The object sensing device according to claim 20, wherein the image scene types include one or more of: (i) guard rail or shrubbery, (ii) gaps between guard rail or shrubbery, (iii) crosswalks, (iv) sidewalks without guard rail, (v) parked vehicles, and (vi) gaps between parked vehicles, and wherein the one or more attributes places includes one or more of: (i) an urban area, (ii) a residential area, (iii) a commercial facility, (iv) a school, (v) highway, (vi) an elevated road, (vii) a mountainous area, and (viii) a road with few intersections.

* * * * *